(12) United States Patent
Mokani et al.

(10) Patent No.: US 9,830,360 B1
(45) Date of Patent: Nov. 28, 2017

(54) DETERMINING CONTENT CLASSIFICATIONS USING FEATURE FREQUENCY

(71) Applicant: Google Inc., Mountain View, CA (US)

(72) Inventors: Dharmeshkumar Mokani, San Jose, CA (US); Madhukar Thakur, San Jose, CA (US)

(73) Assignee: Google LLC, Mountain View, CA (US)

( * ) Notice: Subject to any disclaimer, the term of this patent is extended or adjusted under 35 U.S.C. 154(b) by 386 days.

(21) Appl. No.: 13/796,374

(22) Filed: Mar. 12, 2013

(51) Int. Cl.
G06F 17/30 (2006.01)

(52) U.S. Cl.
CPC .................. G06F 17/3053 (2013.01)

(58) Field of Classification Search
CPC .................. G06F 17/30; G06F 17/30289
USPC .................................................. 707/723
See application file for complete search history.

(56) References Cited

U.S. PATENT DOCUMENTS

| | | | | |
|---|---|---|---|---|
| 8,676,273 B1* | 3/2014 | Fujisaki | ............... | H04M 1/6505 379/142.06 |
| 2006/0132649 A1* | 6/2006 | Miyazawa | ............. | H04N 5/142 348/458 |
| 2006/0229745 A1* | 10/2006 | Ueda | .................... | G05B 19/416 700/63 |
| 2009/0248661 A1* | 10/2009 | Bilenko | ............ | G06F 17/30864 |
| 2009/0319288 A1* | 12/2009 | Slaney | ................... | G06Q 10/10 705/1.1 |
| 2010/0060599 A1* | 3/2010 | Kwak | ................... | G06F 3/0488 345/173 |
| 2010/0228102 A1* | 9/2010 | Addison | .............. | A61B 5/0205 600/301 |
| 2011/0015931 A1* | 1/2011 | Kawahara | ............... | G10L 21/00 704/264 |
| 2011/0187600 A1* | 8/2011 | Landt | ....................... | G01S 3/02 342/458 |
| 2011/0264447 A1* | 10/2011 | Visser | .................... | G10L 25/78 704/208 |
| 2012/0109901 A1* | 5/2012 | Mase | ............... | G06F 17/30265 707/687 |

* cited by examiner

*Primary Examiner* — Mohammad S Rostami
*Assistant Examiner* — Ahmed Abraham
(74) *Attorney, Agent, or Firm* — Patent Law Works LLP

(57) ABSTRACT

The present technology is directed to systems and methods for determining content of interest by determining the occurrence of fast-rising features (for example, URL, fingerprint, etc.) in posts or comments provided by users within an online community, for example, a social network. The systems and methods obtain user-generated content from an online community and determine signals based on the user-generated content to calculate a frequency of the signals as they post or occur in a pre-defined time bucket or window. A first derivative difference of the frequency and a second derivative difference of the frequency is calculated based on formulating consecutive time buckets or "dynamic windows" to determine if one or more of the frequency, the first derivative difference, and the second derivative difference satisfies one or more pre-defined thresholds. The user-generated content is prioritized based on whether it satisfies the one or more pre-defined thresholds.

24 Claims, 9 Drawing Sheets

DETERMINING CONTENT CLASSIFICATIONS USING FEATURE FREQUENCY

BACKGROUND

The present disclosure relates to technology for determining content, for example, spam in an online community, by identifying occurrences of fast-rising features and/or signals in multiple consecutive windows of time.

Web sites with user-generated content, for example, social networks are a frequent target for hackers and spammers. Hackers frequently attempt to acquire information such as usernames, passwords, and credit card details (and sometimes, indirectly, money) by masquerading as a trustworthy source in electronic communications. These acts are referred to as phishing. Phished accounts and malware downloads are used to create a botnet (when computers are penetrated by software from a malware distribution or by malicious software), which is subsequently used to spread spam. Spam is of significant commercial value to hackers. Compromised accounts are very helpful to hackers as people tend to trust messages from friends. Many hackers are continuously posting spam messages, comments, etc.

By the very nature of social networks, some of these attacks tend to spread virally, making the attacks very potent. It takes a great deal of resources to determine if a uniform resource locator ("URL") is harmful; a typical decision required for fetching not only the URL, but also following redirects, fetching, and rendering of each contained resource (URL, image, etc.).

A single user-generated content web site can receive millions of unique URLs each day. As such, it is vital to weed out the "noise" from these URLs and prioritize the list of content for examination. Similarly there are many spam posts and comments that are spread more and more.

SUMMARY

In one innovative aspect, the present disclosure of the technology includes systems including a processor and a memory storing instructions, that when executed, cause the system to receive user-generated content in an online community, for example, a social network, to determine a signal from the user-generated content, calculate a frequency of the signal occurring in multiple consecutive windows of time, determine whether the frequency satisfies a pre-defined frequency threshold, prioritize the user-generated content that satisfies the pre-defined frequency threshold, and classify the user-generated content based on whether the user-generated content is prioritized.

In general, another innovative aspect of the present disclosure includes a method, using at least one computing device, for receiving user-generated content in an online community, determining a signal from the user-generated content, calculating a frequency of the signal occurring in multiple consecutive windows of time, determining whether the frequency satisfies a pre-defined frequency threshold, prioritizing the user-generated content that satisfies the pre-defined frequency threshold, and classifying the user-generated content based on whether the user-generated content is prioritized.

Other implementations of one or more of these aspects include corresponding systems, apparatus, and computer programs, configured to perform the action of the methods, encoded on computer storage devices.

These and other implementations may each optionally include one or more of the following features. For instance, the operations may further include one or more of: calculating a first derivative difference of the frequency of the signal occurring in two consecutive time buckets, determining whether the first derivative difference satisfies a pre-defined first derivative threshold, prioritizing the user-generated content that satisfies the pre-defined first derivative threshold, calculating a second derivative difference of the frequency of the signal based on at least one consecutive time bucket of the first derivative difference, determining whether the second derivative difference satisfies a pre-defined second derivative threshold, prioritizing the user-generated content that satisfies the pre-defined second derivative threshold, and identifying certain of the user-generated content for manual review.

For instance, the features may include: at least one signal including at least one internet protocol, sender identification, post identification, user reputation, posts-to-users ratio, URLs-to-users ratio, posts-to-internet-protocol ratio, and number of spam reports.

The systems and methods disclosed below are advantageous in a number of respects. With the ongoing trends and growth in social network communication, it may be beneficial to find a better way to identify content of interest including unacceptable content, for example, spam within online communities, by identifying occurrences of fast-rising features relating to user-generated content that appear in consecutive time buckets or "dynamic or moving windows."

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In some implementations, this technology includes systems and methods for determining particular content of interest (for example, spam) by identifying occurrences of fast-rising features and/or signals within multiple consecutive windows of time. For example, the systems and methods receive user-generated content or a cluster of user-generated content from an online community (for example, a social network), determine one or more features and/or signals from the user-generated content and determine how quickly or frequently the one or more features and/or signals appear in pre-determined, multiple time buckets or windows of time (for example, windows of half an hour, an hour, a day, etc.) to identify viral activity. The systems and methods prioritize content based on how quickly the features and/or signals appear in the pre-determined multiple time buckets or windows of time (consecutive or "dynamic or moving windows"), determine content (for example, spam) based on their corresponding priority, and filter the user-generated content when it is determined to be particular content or spam. The term "spam" as used here in this description includes phishing content, malware content, etc. References to user-generated content may describe either a single user-generated content item or multiple (i.e., a cluster) of user-generated content items.

Figure 1:
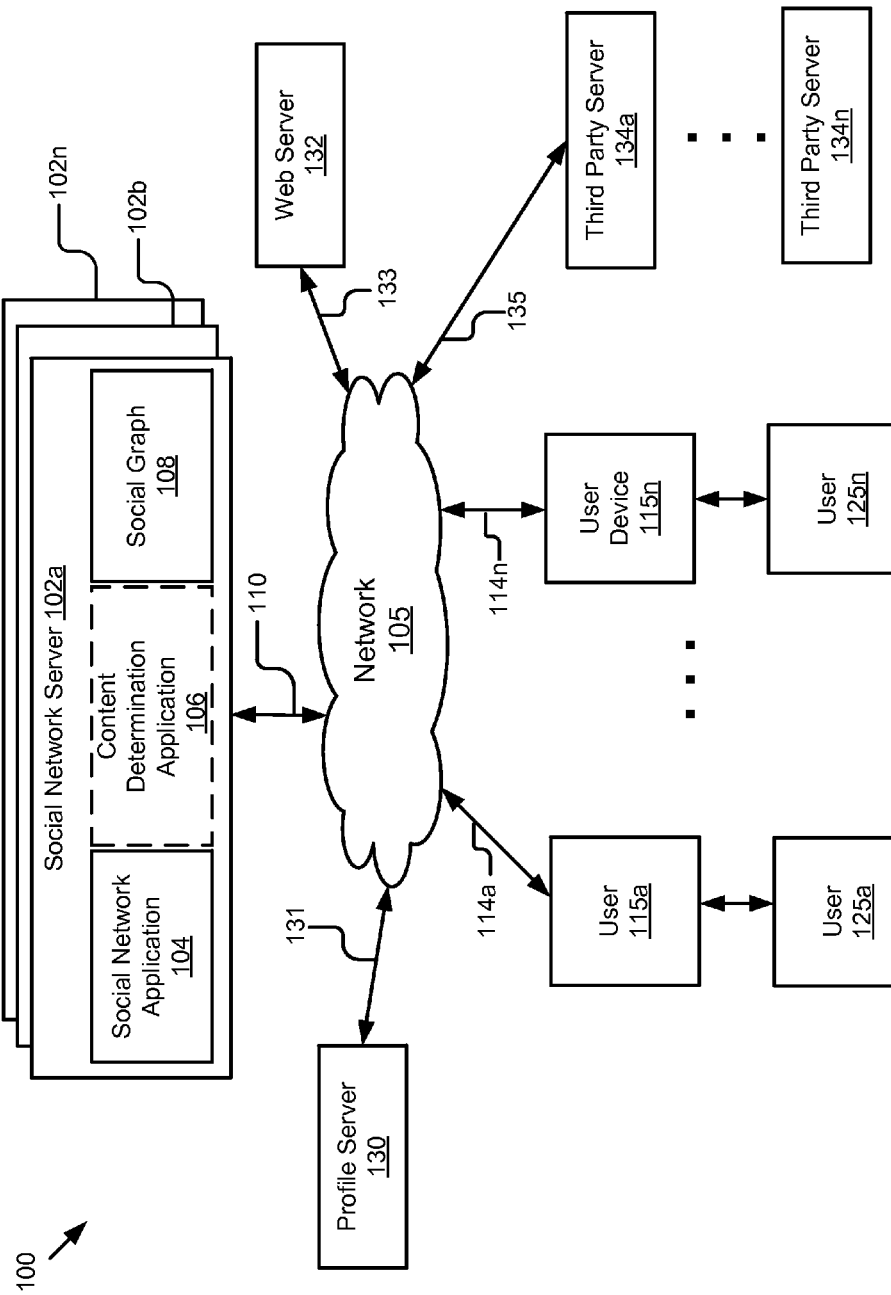
FIG. 1 is a block diagram illustrating an example system for determining content including spam by identifying occurrences of fast-rising features and/or signals including a content determination application.

FIG. 1 is a high-level block diagram illustrating some implementations of systems for determining particular content or spam by identifying occurrences of fast-rising (or frequently occurring) features and/or signals within consecutive or "dynamic windows" of time. The system 100 illustrated in FIG. 1 provides system architecture for determining content or spam by identifying fast-rising features and/or signals within these consecutive or "dynamic windows" of time. The system 100 includes one or more social network servers 102a, 102b, through 102n, that may be accessed via one or more of user devices 115a through 115n, which are used by users 125a through 125n, to connect to one or more of the social network servers 102a, 102b, through 102n. These entities are communicatively coupled via a network 105. Although only two user devices 115a through 115n are illustrated, one or more user devices 115n may be used by one or more users 125n.

Moreover, while the present disclosure is described below primarily in the context of providing a framework for determining particular content of interest including spam within a social network, the present disclosure may be applicable to other situations where determining the particular content of interest including spam for a purpose that is not related to social networks, may be desired. For ease of understanding and brevity, the present disclosure is described in reference to determining particular content of interest including spam within a social network by identifying fast-rising or frequently occurring features and/or signals within consecutive multiple windows of time. Yet, it should be recognized that other content that is of interest or of significance may be identified in a similar way.

The user devices 115a through 115n in FIG. 1 are illustrated simply as one example. Although FIG. 1 illustrates only two devices, the present disclosure applies to a system architecture having one or more user devices 115, therefore, one or more user devices 115n may be used. Furthermore, while only one network 105 is illustrated as coupled to the user devices 115a through 115n, the social network servers, 102a-102n, the profile server 130, the web server 132, and third party servers 134a through 134n, in practice, one or more networks 105 may be connected to these entities. In addition, although only two third party servers 134a through 134n are shown, the system 100 may include one or more third party servers 134n.

In some implementations, the social network server 102a may be coupled to the network 105, via a signal line 110. The social network server 102a includes a social network application 104, which includes the software routines and instructions to operate the social network server 102a and its functions and operations. Although only one social network server 102a is described here, multiple servers may be present, as illustrated by social network servers 102b through 102n, each with functionality similar to social network server 102a or different.

The term "social network" as used here includes, but is not limited to, a type of social structure where the users are connected by a common feature or link. The common feature includes relationships/connections, e.g., friendship, family, work, a similar interest, etc. The common features are provided by one or more social networking systems, for example those included in the system 100, including explicitly-defined relationships and relationships implied by social connections with other online users, where the relationships form the social graph 108.

The term "social graph" as used here includes, but is not limited to, a set of online relationships between users, for example, provided by one or more social networking systems, for example, the social network system 100, including explicitly-defined relationships and relationships implied by social connections with other online users, where the relationships form a social graph 108. In some examples, the social graph 108 may reflect a mapping of these users and how they are related to one another.

The social network server 102a and the social network software/application 104 as illustrated are representative of a single social network. Each of the plurality of social network servers 102a, 102b through 102n, may be coupled to the network 105, each having its own server, application, and social graph. For example, a first social network hosted on a social network server 102a may be directed to business networking, a second on a social network server 102b directed to or centered on academics, a third on a social network server 102c (not separately shown) directed to local business, a fourth on a social network server 102d (not separately shown) directed to dating, and yet others on social network server (102n) directed to other general interests or perhaps a specific focus.

A profile server 130 is illustrated as a stand-alone server in FIG. 1. In other implementations of the system 100, all or part of the profile server 130 may be part of the social network server 102a. The profile server 130 may be connected to the network 105 via a line 131. The profile server 130 has profiles for the users that belong to a particular social network 102a-102n. One or more third party servers 134a through 134n are connected to the network 105, via signal line 135. A web server 132 may be connected, via line 133, to the network 105.

The social network server 102a includes a content determination application 106, to which user devices 115a through 115n are coupled via the network 105. In particular, user devices 115a through 115n may be coupled, via signal lines 114a through 114n, to the network 105. The user 125a interacts via the user device 115a to access the social network server 102a to either view and/or provide user-generated content. The content determination application 106 or certain components of it may be stored in the social network server 102. In some implementations, the content determination application 106 may be included, either partially or entirely, in the social network server 102.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or other electronic devices capable of accessing a network.

The network 105 may be of conventional type, wired or wireless, and may have one or more configurations for example, a star configuration, token ring configuration, or other configurations. Furthermore, the network 105 may comprise a local area network (LAN), a wide area network (WAN, e.g., the Internet), and/or other interconnected data paths across which one or more devices may communicate.

In some implementations, the network 105 may be a peer-to-peer network. The network 105 may also be coupled to or include portions of one or more telecommunications networks for sending data in a variety of different communication protocols.

In some instances, the network 105 includes Bluetooth communication networks or a cellular communications network for sending and receiving data, for example, via short messaging service (SMS), multimedia messaging service (MMS), hypertext transfer protocol (HTTP), direct data connection, WAP, email, etc.

In some implementations, the social network servers, 102a-102n, the profile server 130, the web server 132, and the third party servers 134a through 134n are hardware servers including a processor, memory, and network communication capabilities. One or more of the users 125a through 125n access one or more social network servers 102a through 102n, via browsers in their user devices and via the web server 132.

As one example, in some implementations of the system, the user-generated content of particular users (125a through 125n) of a social network 102a through 102n may be retrieved from the social graph 108. In addition, information to generate the user-generated content may be retrieved. It should be noted that information that may be retrieved for particular users is only upon obtaining the necessary permissions from the users, in order to protect user privacy and sensitive information of the users.

Figure 2:
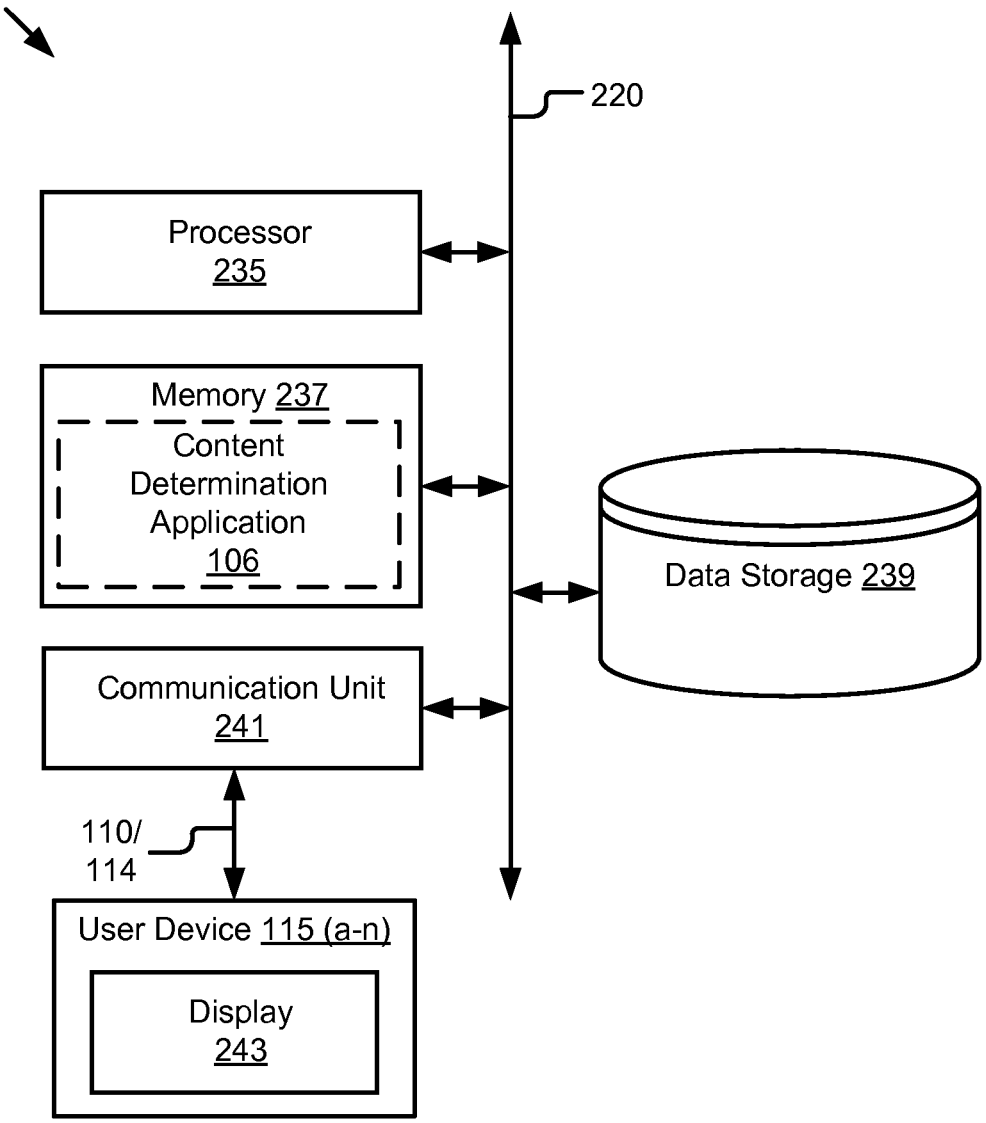
FIG. 2 is a block diagram illustrating example hardware components in some implementations of the system shown in FIG. 1.

FIG. 2 is a block diagram illustrating some implementations of a social network server 102a through 102n, system 200 including a content determination application 106. In FIG. 2, like reference numerals have been used to reference like components with the same or similar functionality that has been described above with reference to FIG. 1. Since those components have been described above that description is not repeated here. The system 200 generally includes one or more processors, although only one processor 235 is illustrated in FIG. 2. The processor may be coupled, via a bus 220, to memory 237 and data storage 239, which stores information relating to the social network including user-generated content, received from the other sources identified above. In some instances, the data storage 239 may be a database organized by the social network 102a-n. In some instances, the content determination application 106 may be stored in the memory 237.

A user 125a, via a user device 115a, may either view and/or provide user-generated content, via communication unit 241. In some implementations, the user device may be communicatively coupled to a display 243 to display information to the user. The content determination application 106 may reside, in its entirety or parts of it, in the social network server 102a (through 102n). The user device 115a communicates with the social network server 102a using the communication unit 241, via signal line 110.

Figure 3A:
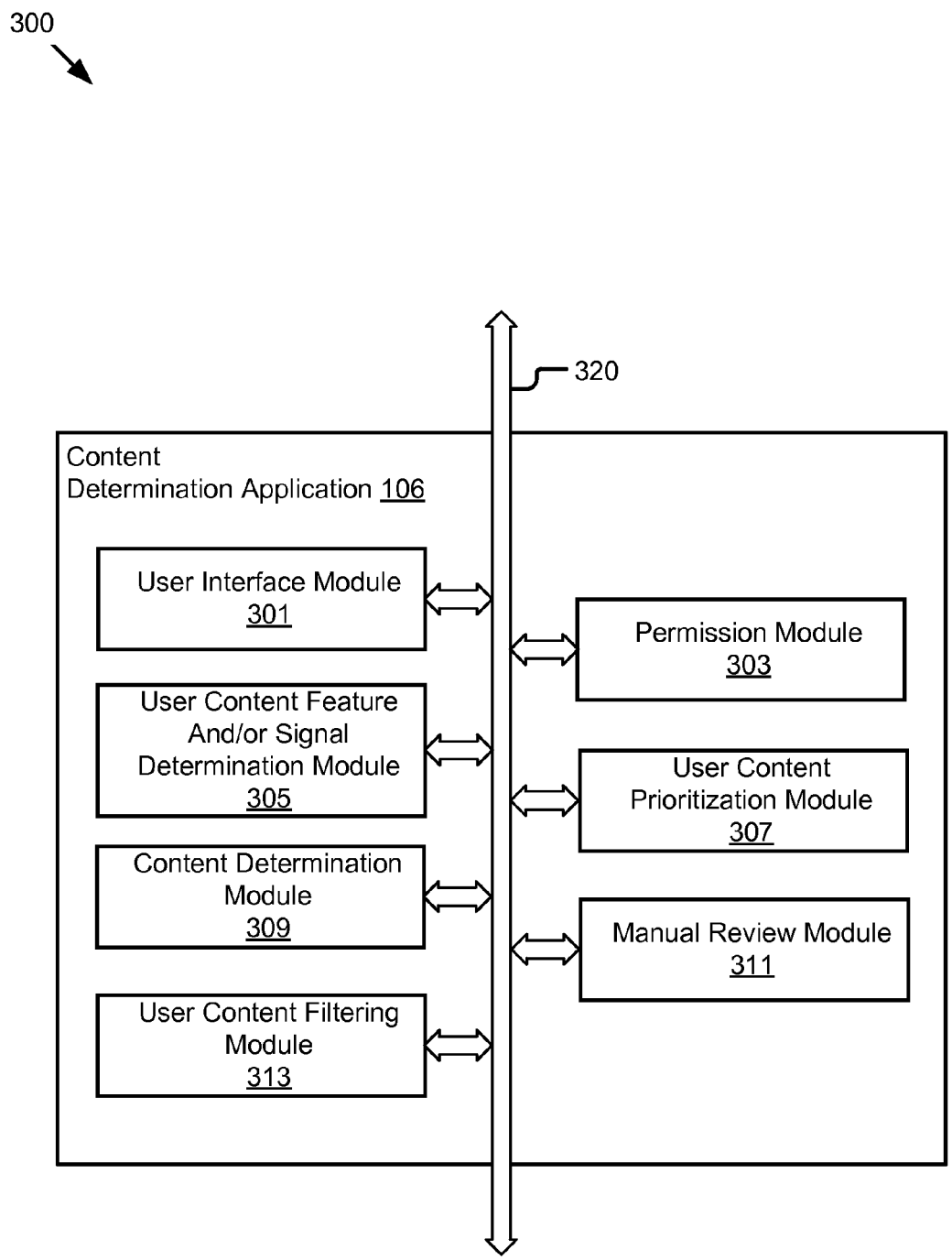
FIG. 3A is a block diagram illustrating an example content determination application and its software components.

Referring now to FIG. 3A, like reference numerals have been used to reference like components with the same or similar functionality that has been described above with reference to FIGS. 1 and 2. Since those components have been described above that description is not repeated here. An implementation of the content determination application 106, indicated in FIG. 3A by reference numeral 300, includes various applications or engines that are programmed to perform the functionalities described here. A user interface module 301 receives user-generated content from a social network and/or generates a user interface for displaying user-generated content on the social network. A permission module 303 determines user permissions for viewing and/or editing content in the social network. A user content feature and/or signal determination module 305 may receive one or more features and/or signals from the user-generated content. A user content prioritization module 307 prioritizes user-generated content by identifying occurrences of fast-rising features and/or signals. A content determination module 309 determines whether content may be spam by determining frequently occurring features and/or signals from the user-generated content. A manual review module 311 sends content to one or more reviewers (e.g., trusted human reviewers) for manual review. A user content filtering module 313 filters user-generated content based on whether the user-generated content may be determined to be spam.

The content determination application 106 includes applications or engines that communicate over the software communication mechanism 320. Software communication mechanism 320 may be an object bus (for example CORBA), direct socket communication (for example TCP/IP sockets) among software modules, remote procedure calls, UDP broadcasts and receipts, HTTP connections, function or procedure calls, etc. Further, the communication could be secure (SSH, HTTPS, etc.). The software communication may be implemented on underlying hardware, for example, a network, the Internet, a bus 220 (FIG. 2), a combination thereof, etc.

The user interface module 301 may be software including routines for receiving user-generated content. In some implementations, the user interface module 301 can be a set of instructions executable by the processor 235 to provide the functionality described below for receiving user-generated content from a social network and/or generating a user interface for displaying user-generated content on the social network. In other implementations, the user interface module 301 can be stored in the memory 237 of the social network server 102 and can be accessible and executable by the processor 235. In either implementation, the user interface module 301 can be adapted for cooperation and communication with the processor 235, the communication unit 241, data storage 239 and other components of the social network server 102 via the bus 220.

In some implementations, the user interface module 301 receives user-generated content from one or more users. For example, the user interface module 301 receives one or more posts, comments, flags, etc. from one or more users of the social network.

In other implementations, the user interface module 301 generates a user interface for displaying information received from one or more modules described below in the spam determination application 106. For example, the user interface module 301 generates one or more user interfaces for displaying user profile information, user-generated content, and/or other information relating to the social network.

The permission module 303 may be software including routines for determining user permissions. In some implementations, the permission module 303 can be a set of instructions executable by the processor 235 to provide the functionality described below for determining user permissions for viewing and/or editing content in the social network. In other implementations, the permission module 303 can be stored in the memory 237 of the social network server 102 and can be accessible and executable by the processor 235. In either implementation, the permission module 303 can be adapted for cooperation and communication with the processor 235, the communication unit 241, data storage 239 and other components of the social network server 102 via the bus 220.

In some implementations, the permission module 303 determines user permissions for viewing and/or editing content to maintain user privacy. In some implementations, the permission module 303 determines which users may view and/or edit social network content (e.g., posts, comments, etc.). In other implementations, the permission module 303 determines which users may add user-generated content to a social network.

The user content feature and/or signal determination module 305 may be software including routines for receiving features and/or signals. In some implementations, the user content feature and/or signal determination module 305 can be a set of instructions executable by the processor 235 to provide the functionality described below for receiving one or more features and/or signals from the user-generated content. In other implementations, the user content feature and/or signal determination module 305 can be stored in the memory 237 of the social network server 102 and can be accessible and executable by the processor 235. In either implementation, the user content feature and/or signal determination module 305 can be adapted for cooperation and communication with the processor 235, the communication unit 241, data storage 239 and other components of the social network server 102 via the bus 220.

In some implementations, the user content feature and/or signal determination module 305 determines features and/or signals from the user-generated content. Features may be additional signals which help identify whether the cluster identified by fast-rising features is spam. For example, features may include, a uniform resource locator (URL) fingerprint, simhash, etc. For example, signals may include, internet protocol (IP), sender identification (ID), post ID, etc. In some implementations, other signals may include, a reputation, posts-to-user ratio, URLs-to-users ratio, posts-to-IPs ratio, number of spam reports, etc. Other signals may depend on feature to feature.

The user content prioritization module 307 may be software including routines for prioritizing user-generated content. In some implementations, the user content prioritization module 307 can be a set of instructions executable by the processor 235 to provide the functionality described below for prioritizing user-generated content by identifying occurrences of fast-rising features and/or signals in multiple consecutive time windows. In other implementations, the user content prioritization module 307 can be stored in the memory 237 of the social network server 102 and can be accessible and executable by the processor 235. In either implementation, the user content prioritization module 307 can be adapted for cooperation and communication with the processor 235, the communication unit 241, data storage 239, and other components of the social network server 102 via the bus 220.

Figure 3B:
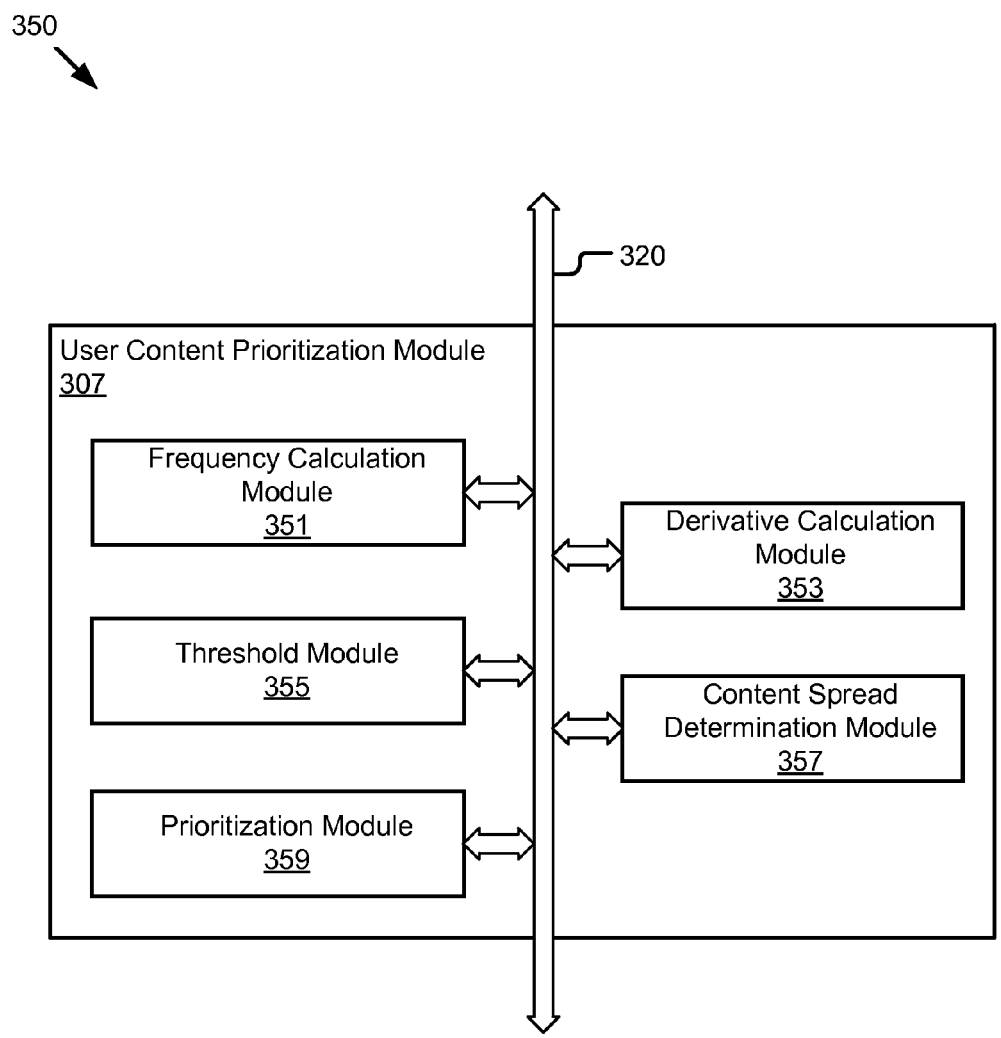
FIG. 3B is a block diagram illustrating an example user content prioritization module and its software components.

Referring now to FIG. 3B, like reference numerals have been used to reference like components with the same or similar functionality that has been described above with reference to FIGS. 1, 2, and 3A. Since those components have been described above that description is not repeated here. The user content prioritization module 307, indicated here by reference numeral 350, include various applications or engines that are programmed to perform the functionalities described here. A frequency calculation module 351 calculates a frequency of features and/or signals occurring in windows of time that are pre-defined, by determining the number of features and/or signals that occur in multiple time buckets or windows of time (for example, configured to define a certain time period—a half an hour, an hour, a day, or the like). The time buckets or windows of time may be consecutive or "dynamic." A derivative calculation module 353 calculates a first derivative difference of the frequency (to determine a rate of change) and a second derivative difference of the frequency (to determine a speed at which the rate of change occurs) based on sampling features or signals in the consecutive, multiple time buckets or windows of time. A threshold module 355 determines whether the frequency satisfies a pre-determined frequency threshold, the first derivative difference satisfies a pre-determined first derivative threshold and/or the second derivative difference satisfies a pre-determined second derivative threshold. A content spread determination module 357 determines whether particular content or spam may be spreading quickly by determining the one or more thresholds and sampling particular content or spam to determine that it satisfies the thresholds. A prioritization module 359 prioritizes user-generated content based on determining that the user-generated content may be spreading quickly. In some implementations, user-generated content is classified by evaluating the frequency with which a feature or signal occurs in multiple, consecutive windows of time (or time buckets), the rate of change of the frequency with which the feature or signal occurs in the consecutive windows of time and the speed at which the rate of change occurs.

The frequency calculation module 351 may be software including routines for calculating a frequency of features and/or signals. In some implementations, the frequency calculation module 351 can be a set of instructions executable by the processor 235 to provide the functionality described below for calculating a frequency of features and/or signals by determining the number of features and/or signals in one or more time buckets (windows of time that are consecutive or "dynamic"). In other implementations, the frequency calculation module 351 can be stored in the memory 237 of the social network server 102 and can be accessible and executable by the processor 235. In either implementation, the frequency calculation module 351 can be adapted for cooperation and communication with the processor 235, the communication unit 241, data storage 239 and other components of the social network server 102 via the bus 220.

In some implementations, the frequency calculation module 351 determines a time bucket and calculates the frequency of the features and/or signals posting or occurring in the specified time bucket (e.g., half hour, one hour, one day, etc.). It should be recognized that it may be desirable to select a time bucket or window of an appropriate period of time. If the frequency calculation module 351 determines a small time bucket (i.e., a window with a small amount of time) there may not be much data for processing. If the frequency calculation module 351 determines a large time bucket (i.e., a window with a long amount of time) the spam content may be identified after a long time (i.e., after the length of the time bucket lapses). In addition, the periods of time for the multiple time windows or time buckets may vary. The frequency may be the number of features and/or signals posting or occurring in the specified time buckets or windows.

In some implementations, the time buckets or windows may be adjusted (e.g., moved) for different features. For example, the spam spread determination module 357 determines the change in the number of features over time (rate of change), over multiple time buckets.

The derivative calculation module 353 may be software including routines for calculating a first derivative difference and a second derivative difference. In some implementations, the derivative calculation module 353 can be a set of instructions executable by the processor 235 to provide the functionality described below for calculating a first derivative difference of the frequency and a second derivative difference of the frequency based on consecutive multiple time buckets. In other implementations, the derivative calculation module 353 can be stored in the memory 237 of the social network server 102 and can be accessible and executable by the processor 235. In either implementation, the derivative calculation module 353 can be adapted for cooperation and communication with the processor 235, the communication unit 241, data storage 239 and other components of the social network server 102 via the bus 220.

In some implementations, the derivative calculation module 353 calculates the first derivative difference of frequency (to compute the rate of change). For example, the first derivative difference of frequency may be the number of features and/or signals in a second time bucket minus the number of features and/or signals in a first time bucket (i.e., F(T2)−F(T1)). This technique calculates to determine whether the number of features and/or signals are either increasing or decreasing in consecutive time buckets or "dynamic windows" of time.

In some implementations, the derivative calculation module 353 calculates or computes the second derivative difference of frequency based on the consecutive time buckets or "dynamic windows" of time. For example, the second derivative difference of frequency based on consecutive time buckets may be the difference of the first derivative of a third time bucket and the second time bucket minus the difference of the first derivative of the second time bucket and the first time bucket (i.e., [F(T3)−F(T2)]−[F(T2)−F(T1)]). This technique calculates whether the number of features and/or signals may be either accelerating or decelerating in consecutive time buckets or "dynamic windows."

The threshold module 355 may be software including routines for determining whether the frequency, the first derivative difference and/or the second derivative difference are over one or more thresholds. In some implementations, the threshold module 355 may be a set of instructions executable by the processor 235 to provide the functionality described below for determining whether the frequency may be over a pre-determined frequency threshold, the first derivative difference may be over a pre-determined first derivative threshold and/or the second derivative difference may be over a pre-determined second derivative threshold. In some implementations, the threshold module 355 can be stored in the memory 237 of the social network server 102 and can be accessible and executable by the processor 235. In either implementation, the threshold module 355 can be adapted for cooperation and communication with the processor 235, the communication unit 241, data storage 239 and other components of the social network server 102 via the bus 220.

In some implementations, the threshold module 355 may receive an absolute frequency threshold, a first derivative threshold, and a second derivative threshold (e.g., by a system engineer). The threshold module 355 may determine whether the absolute frequency, the first derivative difference, and/or the second derivative difference are above one or more of the defined thresholds. If the absolute frequency, the first derivative difference, and/or the second derivative difference are above one or more of the thresholds, then the threshold module 355 may notify the spam spread determination module 357 and the features and/or signals are inspected further.

The spam spread determination module 357 may be software including routines for determining whether spam may be spreading quickly. In some implementations, the spam spread determination module 357 can be a set of instructions executable by the processor 235 to provide the functionality described below for determining whether spam may be spreading quickly by determining the one or more thresholds. In other implementations, the spam spread determination module 357 can be stored in the memory 237 of the social network server 102 and can be accessible and executable by the processor 235. In either implementation, the spam spread determination module 357 can be adapted for cooperation and communication with the processor 235, the communication unit 241, data storage 239, and other components of the social network server 102, via the bus 220.

In some implementations, the spam spread determination module 357 receives the notification from the threshold module 355 and determines whether the number of features and/or signals may be increasing rapidly over time (i.e., spreading quickly). In some implementations, if the number of features and/or signals is increasing rapidly over time, the spam spread determination module 357 sends a notification to the prioritization module 359. In some instances, the spam spread determination module 357 identifies one or more particular features that are rising fast or occurring with greater frequency in the multiple, consecutive time windows.

The prioritization module 359 may be software including routines for prioritizing user-generated content. In some implementations, the prioritization module 359 may be a set of instructions executable by the processor 235 to provide the functionality described below for prioritizing user-generated content based on whether the user-generated content may be spreading quickly. In other implementations, the prioritization module 359 may be stored in the memory 237 of the social network server 102 and may be accessible and executable by the processor 235. In either implementation, the prioritization module 359 may be adapted for cooperation and communication with the processor 235, the communication unit 241, data storage 239, and other components of the social network server 102 via the bus 220.

In some implementations, the prioritization module 359 receives information from the spam spread determination module 357. The prioritization module 359 prioritizes a list of one or more user-generated content items based on how quickly the number of features and/or signals may be increasing over time. For example, user-generated content that includes features and/or signals that may be increasing very fast or quickly is given a higher priority over user-generated content that includes features and/or signals that may be increasing slowly (or steadily) or even decreasing.

Referring back to FIG. 3A, the remaining modules of the spam determination application 106 are described. The content determination module 309 may be software including routines for determining spam or particular content. In some implementations, the content determination module 309 may be a set of instructions executable by the processor 235 to provide the functionality described below for determining whether content may be spam by determining the frequency with which features and/or signals from the user-generated content occur in multiple, consecutive time windows. In some implementations, the content determination module 309 may be stored in the memory 237 of the social network server 102 and may be accessible and executable by the processor 235. In either implementation, the content determination module 309 may be adapted for cooperation and communication with the processor 235, the communication unit 241, data storage 239, and other components of the social network server 102 via the bus 220.

In some implementations, the content determination module 309 examines user-generated content based on the assigned priority assigned by the user content prioritization module 307. For example, the content determination module 309 determines whether certain content may be spam for user content that is designated as "high priority" before user content that is designated as "low priority," depending upon how content is designated. User-generated content may be designated based on significance or importance.

In some implementations, it may be desirable to identify spam by using techniques other than the fast-rising technique described above. For example, there may be instances in which the content determination module 309 identified a certain post, for example, on that indicated "Goog Morning" as spam simply because it crosses the absolute frequency threshold. In some instances, the spam spread determination module 357 may identify a feature that is rising or occurring fast (also referred to as fast-rising). In addition, the content determination module 309 may apply additional signals (e.g., IP, sender ID, post ID, a reputation, posts to user ratio, URLs to users ratio, posts to IPs ratio, number of spam reports, etc.) to distinguish between good clusters (i.e., those that are not spam) and bad clusters (i.e., spam).

In some implementations, the content determination module 309 determines unacceptable content or spam based on evaluating various criteria, for example, whether the number of features and/or signals exceeds the one or more thresholds and whether one or more of the following content or other content may be determined to be spam: 1) uniform resource locators (URLs), 2) fingerprints, 3) simhash, 4) internet protocol (IP), 5) sender identification (ID), 6) post ID, 7) reputation, 8) posts-to-users ratio, uniform-resource-locators-to-users ratio, Posts-to-IP ratio, number of spam reports, and other data. The content determination module 309 may also provide a confidence score based on the certainty with which the content may be determined to be unacceptable, harmful, or otherwise significant (i.e., spam).

In some implementations, if the confidence score is low (i.e., not certain the user-generated content may be spam) the content determination module 309 sends the user-generated content to the manual review module 311.

In some implementations, if a user posts the same content many times, over and over again, the content determination module 309 may check the fingerprint of the user. By this process, the content determination module 309 may be configured to automatically classify possible spam events. In most instances, spam or other significant content is usually spread by only a few users and/or accounts. Therefore, the content determination module 309 can effectively determine the few accounts or users that are spreading spam and arrest their activity. In some instances, the content determination module 309 can identify a spam event by noting how quickly it is spreading and may quickly and automatically stop spam from spreading. In the event content that is spam spreads slowly, a manual check may be performed to prevent false positive indications.

As one example, the content determination module 309 may determine spam based on whether a particular user posts the same content repeatedly. As another example, the content determination module 309 may determine if a threshold number of particular users post content, based on a comparison of signatures of the particular users who are posting content. As yet another example, the content determination module 309 may consider if a particular user is posting many types of content quickly.

In some instances, content may be classified for review based on consideration of whether a particular user posts the same content fifty times in a particular window of time, for example, in half an hour. In some instances, content may be classified for review based on whether ten particular users post content fifty times in the same time period or window. In some instances, content may be classified for a manual review if it is not certain whether the content is spam.

The manual review module 311 may be software including routines for designating and sending content for manual review. In some implementations, the manual review module 311 can be a set of instructions executable by the processor 235 to provide the functionality described below for sending content to one or more reviewers (e.g., trusted human reviewers or administrators) for a manual review or consideration. In other implementations, the manual review module 311 may be stored in the memory 237 of the social network server 102 and may be accessible and executable by the processor 235. In either implementation, the manual review module 311 may be adapted for cooperation and communication with the processor 235, the communication unit 241, data storage 239 and other components of the social network server 102 via the bus 220.

In some implementations, the manual review module 311 sends the user-generated content to one or more reviewers (e.g., trusted human reviewers or administrators) for manual review. For example, in the event the content determination module 309 cannot determine (with certainty) that particular user-generated content is spam, it may therefore, send the user-generated content to the manual review module 311, which may send the user-generated content to a human reviewer to determine whether the particular content is spam.

The user content filtering module 313 may be software including routines for filtering user-generated content. In some implementations, the user content filtering module 313 may be a set of instructions executable by the processor 235 to provide the functionality described below for filtering user-generated content based on whether the user-generated content may be determined to be spam. In some implementations, the user content filtering module 313 may be stored in the memory 237 of the social network server 102 and may be accessible and executable by the processor 235. In either implementation, the user content filtering module 313 may be adapted for cooperation and communication with the processor 235, the communication unit 241, data storage 239 and other components of the social network server 102 via the bus 220.

In some implementations, the user content filtering module 313 filters user-generated content based on whether the content determination module 309 and/or the manual review module 311 have determined the user-generated content to be spam. For example, the user content filtering module 313 may remove user-generated content (or clusters of one or more user-generated content) from the social network, notify the owner of the user-generated content, and mark the user-generated content as spam.

Figure 4A:
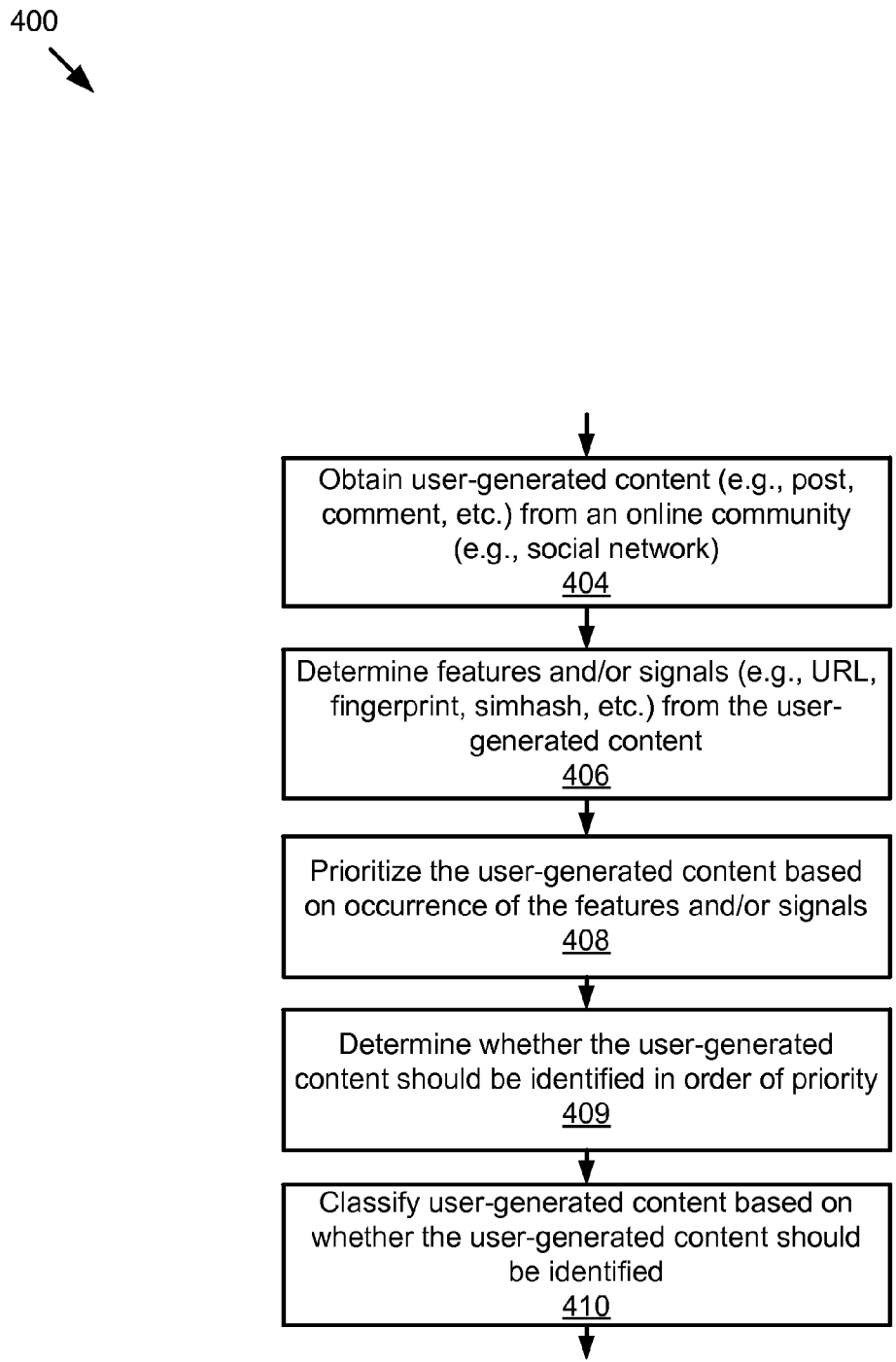
FIG. 4A is a flowchart of an example method for filtering user-generated content.

FIG. 4A is a flow chart illustrating an example method indicated by reference numeral 400 for classifying user-generated content. It should be understood that the order of the operations in FIG. 4A is merely by way of example and may be performed in different orders than those that are illustrated and some operations may be excluded, and different combinations of the operations may be performed. In the example method illustrated, one or more operations may include receiving or obtaining user-generated content (for example, a post, a comment, etc.) from an online community (for example, a social network), as illustrated by block 404. The method 400 then proceeds to the next block 406 and may include one or more operations to determine features and/or signals (for example, URL, fingerprint, simhash, etc.) from the user-generated content. The method 400 then proceeds to the next block 408 and may include one or more operations to prioritize the user-generated content based on occurrence of the features and/or signals. The method 400 then proceeds to the next block 409 and may include one or more operations to determine whether the user-generated content should be identified (e.g., spam) in order of priority. The method 400 then proceeds to the next block 410 and may include one or more operations to classify the user-generated content based on whether the user-generated content should be identified (e.g., spam).

Figure 4B:
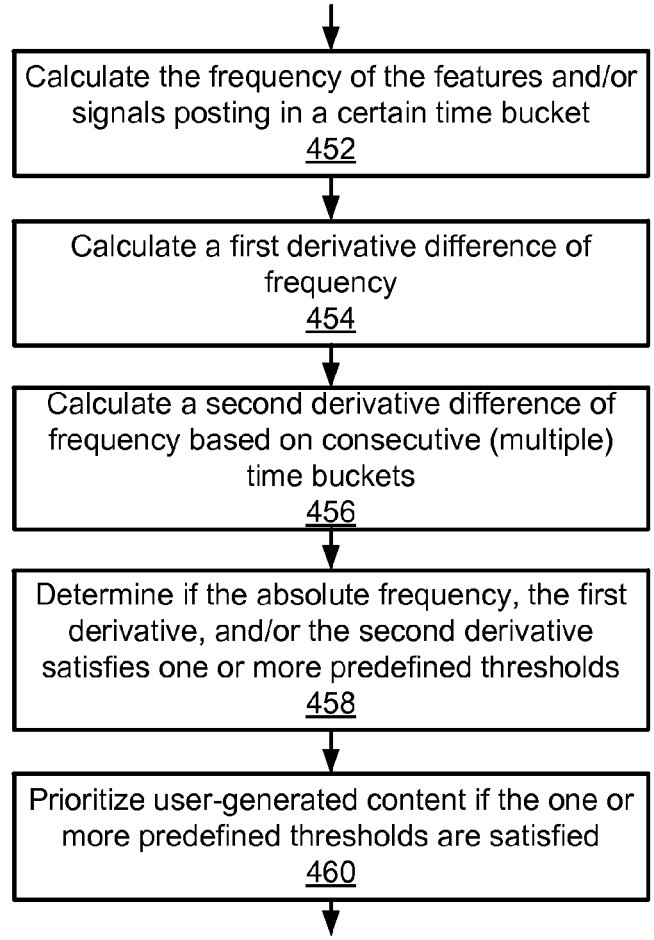
FIG. 4B is a flowchart of an example method for prioritizing user-generated content.

FIG. 4B is a flow chart illustrating an example method indicated by reference numeral 450 for prioritizing user-generated content. It should be understood that the order of the operations in FIG. 4B is merely by way of example and may be performed in different orders than those that are illustrated and some operations may be excluded, and different combinations of the operations may be performed. In the example method illustrated, one or more operations may include calculating the frequency of the features and/or signals posting in a certain time bucket or window, as illustrated by block 452. The method 450 then proceeds to the next block 454 and may include one or more operations to calculate a first derivative difference of frequency. The method 450 then proceeds to the next block 456 and may include one or more operations to calculate a second derivative difference of frequency based on consecutive (multiple) time buckets or "dynamic windows." The method 450 then proceeds to the next block 458 and may include one or more operations to determine if the absolute frequency, the first derivative, and/or the second derivative satisfy one or more pre-defined thresholds (levels). The method 450 then proceeds to the next block 460 and may include one or more operations to prioritize user-generated content based on if the one or more pre-defined thresholds are satisfied.

Figure 4C:
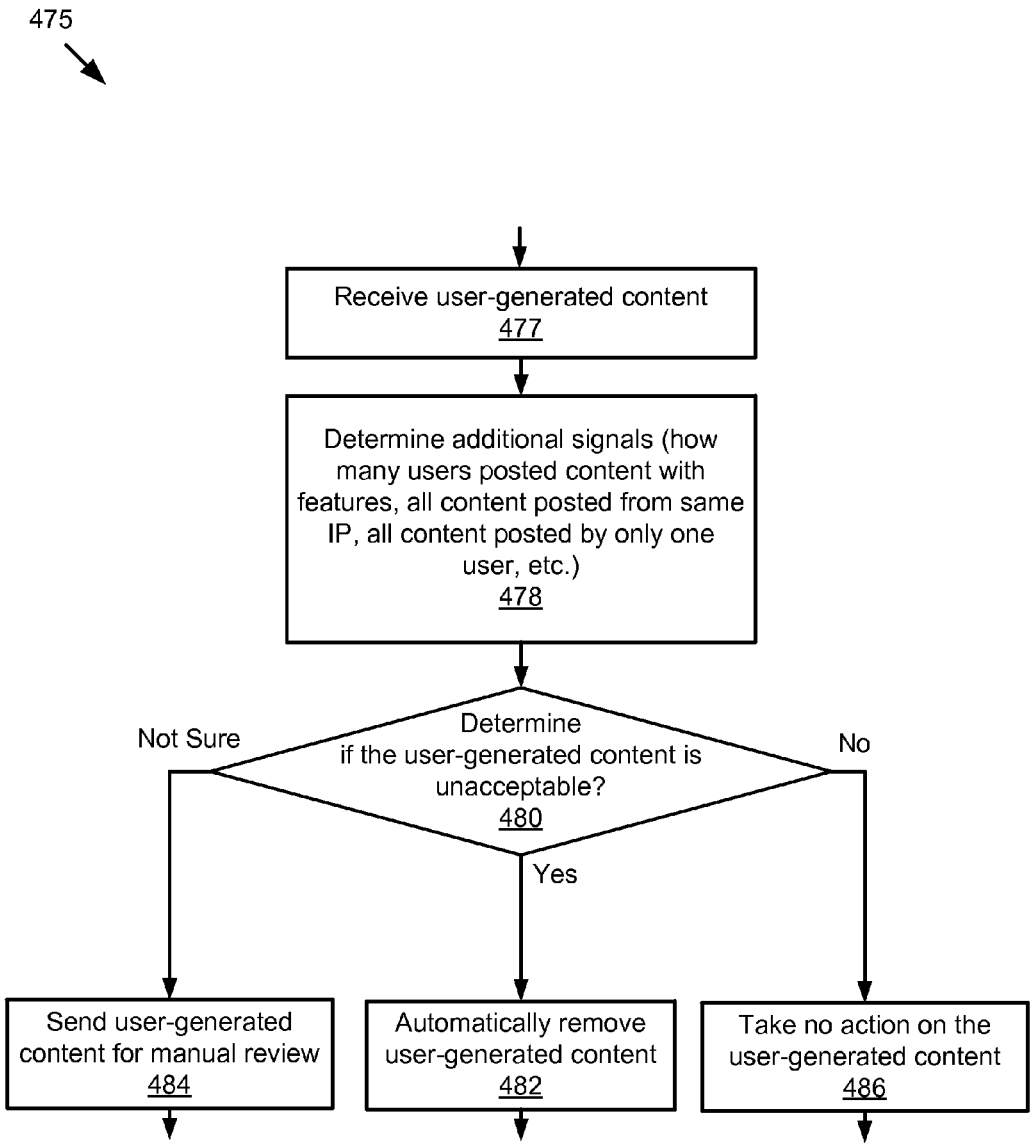
FIG. 4C is a flowchart of an example method for sending user-generated content for manual review.

FIG. 4C is a flow chart illustrating an example method indicated by reference numeral 475 for designating and sending user-generated content for manual review. It should be understood that the order of the operations in FIG. 4C is merely by way of example and may be performed in different orders than those that are illustrated and some operations may be excluded, and different combinations of the operations may be performed. In the example method illustrated, one or more operations may include receiving user-generated content, as illustrated by block 477. The method 475 then proceeds to the next block 478 and may include one or more operations to determine additional signals that high-light questionable activity (for example, how many users posted content with features, all content posted from a same IP, all content posted by only one user, etc.). The method 475 then proceeds to the next block 480 and may include one or more operations to determine if the user-generated content is unacceptable (e.g., spam) or otherwise significant for classification. If it is determined that the user-generated content is unacceptable or otherwise significant for classification, the method 475 then proceeds to the next block 482 and may include one or more operations to automatically remove the user-generated content. If there is uncertainty that the user-generated content is unacceptable, the method 475 then proceeds to the next block 484 and may include one or more operations to designate and send the user-generated content for manual review. If it is determined that the user-generated content is acceptable, the method 475 then proceeds to the next block 486 and may include one or more operations to take no action on the user-generated content, for example, allow the user-generated content to proceed as intended.

Figure 5:
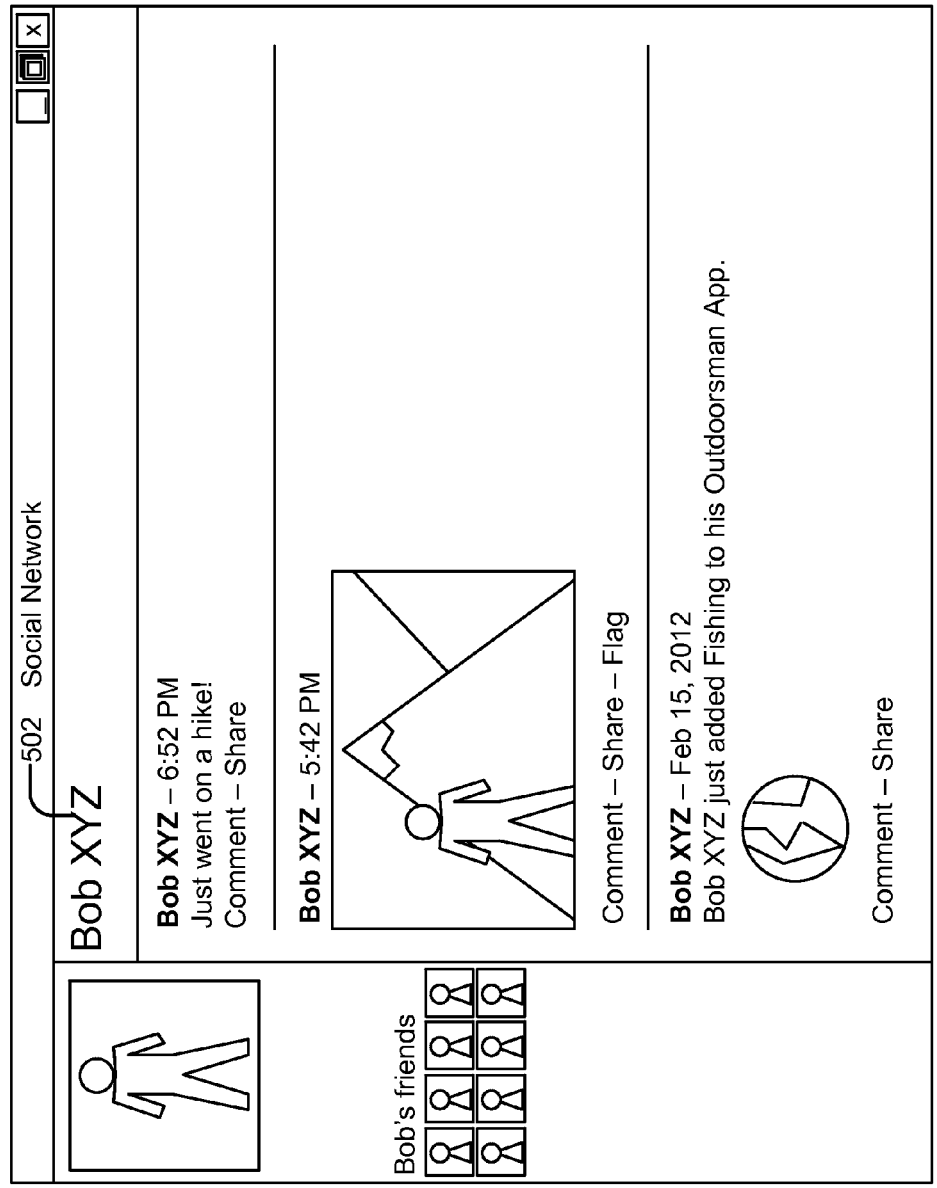
FIG. 5 is a graphic representation of an example user interface for displaying user-generated content.

FIG. 5 is a graphic representation of an example user interface for displaying user-generated content. The user interface 500 as illustrated includes a user's social stream (in this instance, an example social stream for user Bob XYZ), indicated by reference numeral 502. The social stream illustrated includes three example posts (i.e., examples of user-generated content). Each post includes a comment and a "share" link.

Figure 6:
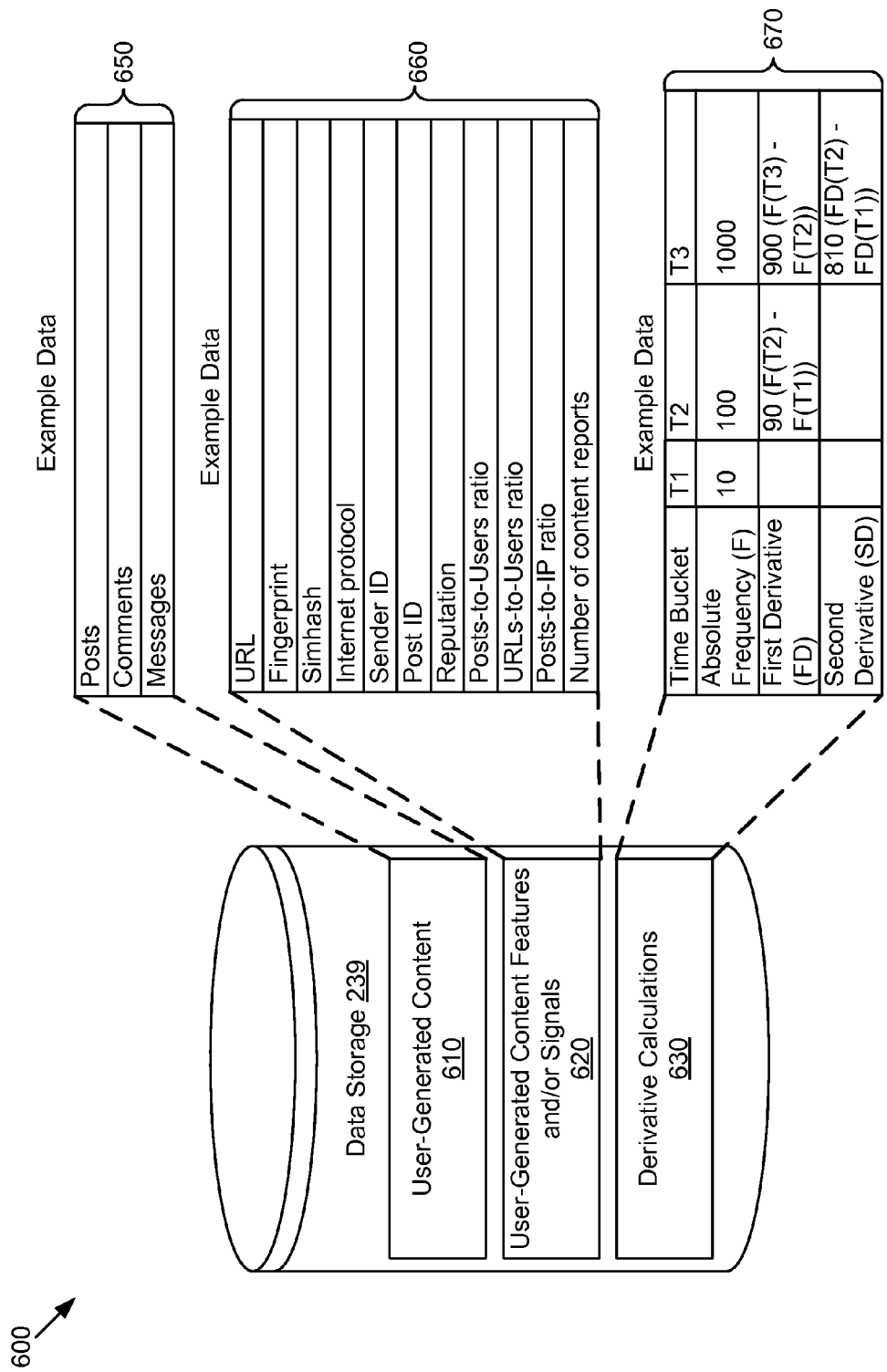
FIG. 6 is a block diagram illustrating example data storage and its data components.

FIG. 6 is a block diagram illustrating example data storage 239 and its data components, indicated by reference numeral 600. In this example, the data storage 239 includes user-generated content 610, user-generated content features and/or signals 620, and derivative calculations 630. In some implementations, the user-generated content 610 includes data 650 including one or more posts, comments, messages, and other types of user-generated content. In some implementations, the user-generated content features and/or signals 620 include data 660 including one or more uniform resource locators (URLs), fingerprints, simhash, internet protocol (IP), sender identification (ID), post ID, reputation, posts-to-users ratio, URLs-to-users ratio, posts-to-IP ratio, number of content reports, and other data that may be used in determining whether certain content is spam. In some implementations, the derivative calculations 630 include data relating to time buckets or windows of time, for example, the table 670 includes three consecutive time buckets or windows T1, T2, and T3. As one example that is illustrated, the time bucket or window T1 includes a number (representing a frequency) 10 (content features and/or signals identified in that time bucket). In the illustrated example, the time bucket or window T2 includes a number (i.e., frequency) of 100 (content features and/or signals existing in that time bucket), and a first derivative 90 (i.e., 100-10). In the illustrated example, the time bucket or window T3 includes a number (i.e., frequency) of 1000 (content features and/or signals occurring in that time bucket), and a second derivative 810 (i.e., 900-90). This technique provides three separate numbers or indications for determining whether one or more features and/or signals are appearing more or less frequently in consecutive, multiple time buckets or windows. In the illustrated example, the absolute frequency (indicates the rate of occurrence), the first derivative difference (indicates the rate in change of the occurrence), and the second derivative difference (the speed at which the change occurs) show that the number of features and/or signals may be increasing at a large rate.

In the preceding description, for purposes of explanation, numerous specific details are indicated in order to provide a thorough understanding of the technology described. This technology may be practiced without these specific details. In the instances illustrated, structures and devices are shown in block diagram form in order to avoid obscuring the technology. For example, the present technology is described with some implementations illustrated above with reference to user interfaces and particular hardware. However, the present technology applies to a type of computing device that can receive data and commands, and devices providing services. Moreover, the present technology is described above primarily in the context of providing support for identifying spam within a social network; however, the present technology applies to types of situation and may be used for other applications beyond social networks. In particular, this technology may be used in other contexts besides social networks.

Reference in the specification to "one implementation," "an implementation," or "some implementations" means simply that one or more particular features, structures, or characteristics described in connection with the one or more implementations is included in at least one or more implementations that are described. The appearances of the phrase "in one implementation or instance" in various places in the specification are not necessarily referring to the same implementation or instance.

Some portions of the preceding detailed descriptions are presented in terms of algorithms and symbolic representations of operations on data bits within a computer memory of either one or more computing devices. These algorithmic descriptions and representations are the means used to most effectively convey the substance of the technology. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that these and similar terms are to be associated with the appropriate physical quantities and are merely convenient labels applied to these quantities. Unless specifically stated otherwise, as apparent from the preceding discussion, it should be appreciated that throughout the description, discussions utilizing terms, for example, "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. For example, a computer program may be stored in a computer-readable storage medium, for example, but not limited to, a type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or a type of media suitable for storing electronic instructions, each coupled to a computer system bus.

This technology may take the form of an entirely hardware implementation, an entirely software implementation, or an implementation including both hardware and software components. In some instances, this technology is implemented in software, which includes but is not limited to firmware, resident software, microcode, etc.

Furthermore, this technology may take the form of a computer program product accessible from a computer-usable or computer-readable medium providing program code for use by or in connection with a computer or an instruction execution system. For the purposes of this description, a computer-usable or computer-readable medium may be an apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code may be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to a particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to a particular programming language. It should be understood that a variety of programming languages may be used to implement the technology as described here.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. The present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, the modules, routines, features, attributes, methodologies, and other aspects of the present technology can be implemented as software, hardware, firmware, or a combination of the three. Also, wherever a component, an example of which may be a module, of the present technology may be implemented as software, the component can be implemented as a standalone program, as part of a larger program, as a plurality of separate programs, as a statically or dynamically linked library, as a kernel loadable module, as a device driver, and/or in other ways. Additionally, the present technology is in no way limited to implementation in a specific programming language, or for a specific operating system or environment. Accordingly, the disclosure of the present technology is intended to be illustrative, but not limiting, of the scope of the present disclosure, which is set forth in the following claims.

What is claimed is:

1. A method comprising: receiving, using at least one computing device, user-generated content items in an online community;
   determining, using the at least one computing device, a signal from the user-generated content items;
   calculating, using the at least one computing device, a first frequency indicating a first number of times the signal has occurred in a first window of a pre-determined period of time and a second frequency indicating a second number of times the signal has occurred in a second window of the pre-determined period of time, the second window being consecutive to the first window;
   determining, using the at least one computing device, whether the first frequency satisfies a pre-defined frequency threshold;
   calculating, using the at least one computing device, a rate of change between the first frequency and the second frequency based on a first derivative difference between the first frequency of the signal occurring in the first window and the second frequency of the signal occurring in the second window;
   identifying, using the at least one computing device, a fast-rising occurrence of the signal by determining that the second frequency of the signal occurring in the second window is greater than the first frequency of the signal occurring in the first window;
   in response to the first frequency satisfying the pre-defined frequency threshold and the fast-rising occurrence of the signal being identified, determining, using the at least one computing device, a priority level for a content item including the signal in the user-generated content items based upon the rate of change between the first frequency and the second frequency;
   classifying, using the at least one computing device, the user-generated content items in an order of the priority level, the user-generated content items being classified into a first category and a second category; and
   automatically removing, using the at least one computing device, first content items classified into the first category from the user-generated content items.

2. The method according to claim 1, further comprising:
   determining, using the at least one computing device, whether the first derivative difference satisfies a pre-defined first derivative threshold.

3. The method according to claim 2, further comprising:
   in response to the first derivative difference satisfying the pre-defined first derivative threshold, prioritizing, using the at least one computing device, the content item including the signal in the user-generated content items.

4. The method according to claim 1, further comprising:
   calculating, using the at least one computing device, a plurality of first derivative differences in frequency of the signal occurring in consecutive windows of the pre-determined period of time;
   calculating, using the at least one computing device, a second derivative difference in frequency of the signal based on the plurality of first derivative differences.

5. The method according to claim 4, further comprising:
   determining, using the at least one computing device, whether the second derivative difference satisfies a pre-defined second derivative threshold.

6. The method according to claim 5, further comprising:
   in response to the second derivative difference satisfying the pre-defined second derivative threshold, prioritizing, using the at least one computing device, the content item including the signal in the user-generated content items.

7. The method according to claim 1, further comprising:
   identifying a classified content item in the user-generated content items for manual review.

8. A computer program product comprising a non-transitory computer usable medium including a computer readable program, wherein the computer readable program when executed on a computer causes the computer to: receive user-generated content items in an online community;
   determine a signal from the user-generated content items;
   calculate a first frequency indicating a first number of times the signal has occurred in a first window of a pre-determined period of time and a second frequency indicating a second number of times the signal has occurred in a second window of the pre-determined period of time, the second window being consecutive to the first window;
   determine whether the first frequency satisfies a pre-defined frequency threshold;
   calculate a rate of change based on a first derivative difference between the first frequency of the signal occurring in the first window and the second frequency of the signal occurring in the second window;
   identify a fast-rising occurrence of the signal by determining that the second frequency of the signal occurring in the second window is greater than the first frequency of the signal occurring in the first window;
   in response to the first frequency satisfying the pre-defined frequency threshold and the fast-rising occurrence of the signal being identified, determine a priority level for a content item including the signal in the user-generated content items based upon the rate of change between the first frequency and the second frequency;
   classify the user-generated content items in an order of the priority level, the user-generated content items being classified into a first category and a second category; and
   automatically remove first content items classified into the first category from the user-generated content items.

9. The computer program product according to claim 8, wherein the computer readable program when executed on the computer causes the computer to:
   determine whether the first derivative difference satisfies a pre-defined first derivative threshold.

10. The computer program product according to claim 9, wherein the computer readable program when executed on the computer causes the computer to:
    in response to the first derivative difference satisfying the pre-defined first derivative threshold, prioritize the content item including the signal in the user-generated content items.

11. The computer program product according to claim 8, wherein the computer readable program when executed on the computer causes the computer to:

calculate a plurality of first derivative differences in frequency of the signal occurring in consecutive windows of the pre-determined period of time; and calculate a second derivative difference in frequency of the signal based on the plurality of first derivative differences.

12. The computer program product according to claim 11, wherein the computer readable program when executed on the computer causes the computer to:

determine whether the second derivative difference satisfies a pre-defined second derivative threshold.

13. The computer program product according to claim 12, wherein the computer readable program when executed on the computer causes the computer to:

in response to the second derivative difference satisfying the pre-defined second derivative threshold, prioritize the content item including the signal in the user-generated content items.

14. The computer program product according to claim 8, wherein the computer readable program when executed on the computer causes the computer to:

identify a classified content item in the user-generated content items for manual review.

15. A system comprising: a processor, and; a memory storing instructions that, when executed, cause the system to: receive user-generated content items in an online community;

determine a signal from the user-generated content items;

calculate a first frequency indicating a first number of times the signal has occurred in a first window of a pre-determined period of time and a second frequency indicating a number of times the signal has occurred in a second window of the pre-determined period of time, the second window being consecutive to the first window;

determine whether the first frequency satisfies a pre-defined frequency threshold;

calculate a rate of change based on a first derivative difference between the first frequency of the signal occurring in the first window and the second frequency of the signal occurring in the second window;

identify a fast-rising occurrence of the signal by determining that the second frequency of the signal occurring in the second window is greater than the first frequency of the signal occurring in the first window;

in response to the first frequency satisfying the pre-defined frequency threshold and the fast-rising occurrence of the signal being identified, determine a priority level for a content item including the signal in the user-generated content items based upon the rate of change between the first frequency and the second frequency;

classify the user-generated content items in an order of the priority level, the user-generated content items being classified into a first category and a second category; and automatically remove first content items classified into the first category from the user-generated content items.

16. The system according to claim 15, wherein the instructions, when executed, cause the system to:

determine whether the first derivative difference satisfies a pre-defined first derivative threshold.

17. The system according to claim 16, wherein the instructions, when executed, cause the system to:

in response to the first derivative difference satisfying the pre-defined first derivative threshold, prioritize the content item including the signal in the user-generated content items.

18. The system according to claim 15, wherein the instructions, when executed, cause the system to:

calculate a plurality of first derivate differences in frequency of the signal occurring in consecutive windows of the pre-determined period of time;

calculate a second derivative difference in frequency of the signal based on the plurality of first derivative differences.

19. The system according to claim 18, wherein the instructions, when executed, cause the system to:

determine whether the second derivative difference satisfies a pre-defined second derivative threshold.

20. The system according to claim 19, wherein the instructions, when executed, cause the system to:

in response to the second derivative difference satisfying the pre-defined second derivative threshold, prioritize the content item including the signal in the user-generated content items.

21. The system according to claim 15, wherein the instructions, when executed, cause the system to identify a classified content item in the user-generated content items for manual review.

22. The method according to claim 1, wherein the signal determined from the user-generated content items includes one of a Uniform Resource Locator (URL), a fingerprint, a simhash, an Internet Protocol (IP), a sender identification, a post identification, user reputation, a posts-to-users ratio, a URLs-to-users ratio, a posts-to-IP ratio, and a number of content reports.

23. The computer program product according to claim 8, wherein the signal determined from the user-generated content items includes one of a Uniform Resource Locator (URL), a fingerprint, a simhash, an Internet Protocol (IP), a sender identification, a post identification, user reputation, a posts-to-users ratio, a URLs-to-users ratio, a posts-to-IP ratio, and a number of content reports.

24. The system according to claim 15, wherein the signal determined from the user-generated content items includes one of a Uniform Resource Locator (URL), a fingerprint, a simhash, an Internet Protocol (IP), a sender identification, a post identification, user reputation, a posts-to-users ratio, a URLs-to-users ratio, a posts-to-IP ratio, and a number of content reports.

* * * * *